United States Patent
Farrar et al.

(10) Patent No.: US 6,263,345 B1
(45) Date of Patent: Jul. 17, 2001

(54) HISTOGRAM SYNTHESIS MODELER FOR A DATABASE QUERY OPTIMIZER

(75) Inventors: Christopher M. Farrar, Los Gatos; Harry A. Leslie, Los Altos, both of CA (US); Pedro Celis, Austin, TX (US); Diana L. Shak, San Jose, CA (US)

(73) Assignee: Compaq Computers, Corporation, Houston, TX (US)

( * ) Notice: Subject to any disclaimer, the term of this patent is extended or adjusted under 35 U.S.C. 154(b) by 0 days.

(21) Appl. No.: 09/162,245

(22) Filed: Sep. 28, 1998

(51) Int. Cl.$^7$ ................................................. G06F 17/30
(52) U.S. Cl. ................................. 707/104; 707/2; 707/3; 364/468.17; 340/825.44
(58) Field of Search .................................. 707/2, 3, 104; 340/825.44; 364/468.17; 600/407

(56) References Cited

U.S. PATENT DOCUMENTS

| | | | |
|---|---|---|---|
| 5,367,675 | 11/1994 | Cheng et al. | 395/600 |
| 5,546,570 | 8/1996 | McPherson et al. | 395/600 |
| 5,548,755 | 8/1996 | Leung et al. | 395/600 |
| 5,619,692 | 4/1997 | Malkemus et al. | 395/602 |
| 5,625,815 | * 4/1997 | Maier et al. | 707/8 |
| 5,630,120 | 5/1997 | Vachey | 395/602 |
| 5,689,696 | 11/1997 | Gibbons et al. | 395/601 |
| 5,696,686 | * 12/1997 | Sanka et al. | 364/468.17 |

(List continued on next page.)

OTHER PUBLICATIONS

Article by Clifford A. Lynch entitled "Selectivity Estimation and Query Optimization in Large Databases with Highly Skewed Distributions of Column Values" published by University of California, dated 1988 pp. 240–251.

Article by Piatetsky–Shapiro et al. entitled "Accurate Estimation of the Number of Tuples Satisfying a Condition" published by ACM dated, 1984 pp. 256–276.

Article by Haas et al. entitled "Sampling–Based Estimation of the Number of Distinct Values of an Attribute" published by Proceedings of the 21$^{st}$ VLDB Conference, dated 1995 pp. 311–321.

Article by Yannis E. Ioannidis entitled "Universality of Serial Histograms" published by Proceedings of the 19th VLDB Conference, dated 1993 pp. 256–267.

(List continued on next page.)

*Primary Examiner*—Thomas Black
*Assistant Examiner*—Charles L. Rones
(74) *Attorney, Agent, or Firm*—Fenwick & West LLP

(57) ABSTRACT

The invention provides a mechanism for using statistics, in connection with various database query cost modeling techniques, to more accurately estimate the number of rows and UECs that will be produced by relational operators and predicates in database systems. The ability to accurately estimate the number of rows and UECs returned by a relational operator and/or a predicate is fundamental to computing the cost of a query execution plan. This, in turn, drives the optimizer's ability to select the query plan best suited for the desired performance goal. According to the present invention, histogram statistics are synthesized bottom up from the leaf nodes to the root node of a query tree. Given input statistics in the form of histograms for each operand of a relational operator or predicate, the present inventive method and apparatus merge the input statistics in a way that it simulates the effects of the run time operator on the actual data, so as to produce a predicted row count and UEC for each histogram interval representative of the data that actually will be produced by each such operator or predicate in the query tree. A database query optimizer may use these statistics to select and implement an optimal query plan.

14 Claims, 3 Drawing Sheets

U.S. PATENT DOCUMENTS

| | | | |
|---|---|---|---|
| 5,717,911 | * 2/1998 | Madrid et al. | 707/2 |
| 5,724,570 | * 3/1998 | Zeller et al. | 707/3 |
| 5,761,654 | 6/1998 | Tow | 707/2 |
| 5,803,914 | * 9/1998 | Ryals et al. | 600/407 |
| 5,819,255 | * 10/1998 | Celis et al. | 707/2 |
| 5,822,747 | * 10/1998 | Graefe et al. | 707/2 |
| 5,870,752 | * 2/1999 | Gibbons et al. | 707/102 |
| 5,942,986 | * 8/1999 | Shabot et al. | 340/825.44 |
| 5,963,957 | * 10/1999 | Hoffberg | 707/104 |
| 6,012,054 | * 1/2000 | Seputis | 707/3 |
| 6,021,405 | * 2/2000 | Celis et al. | 707/2 |

OTHER PUBLICATIONS

Article by Mackert et al. Entitled "R* Optimizer Validation and Performance Evaluation for Distributed Queries" published by Proceedings of the 12$^{th}$ International Conference on Very Large Databases, dated 1986 pp. 149–159.

Article by Leonard D. Shapiro entitled "Join Processing in Database Systems with Large Main Memories" published by ACM Transactions on Database Systems dated 1986, vol. 11, No. 3, pp. 239–264.

Article by Selinger et al., entitled "Access Path Selection in a Relational Database Management System" published by ACM dated 1979, pp. 23–34.

Article by Sun et al. entitled: "An Instant and Accurate Size Estimation Method for Joins and Selection in a Retrieval–Intensive Environment." SIGMOD, May 1993, pp. 79–88.

Article by Poosala et al. entitled: "Improved Histograms for Selectivity Estimation of Range Predicates" SIGMOD Jun. 1996, pp. 294–305.

* cited by examiner

HISTOGRAM SYNTHESIS MODELER FOR A DATABASE QUERY OPTIMIZER

CROSS-REFERENCE TO RELATED APPLICATION

This application is related to the currently co-pending U.S. patent application Ser. No. 09/162,638 of Christopher M. Farrar, Harry A. Leslie, Pedro Celis, Diana L. Shak, Jay H. Vaishnav, and Michael J. Skarpelos, entitled "Database Query Cost Model Optimizer," filed Sep. 28, 1998.

BACKGROUND OF THE INVENTION

This invention relates to the filed of database query optimizers, and more particularly, to an improved method and apparatus for using and manipulating histogram statistics to more accurately estimate the number of rows and unique entry counts where a "UECs" is the number of unique values represented within any particular interval of a histogram, in each histogram interval that will be produced by relational operators and predicates in a database query system. Where relational operators are operators that receive one or more tables as input and produce a new table as an output. Join, Union and Union All are examples of operators that receive two tables as inputs. Group-by and Sort are examples of relational operators that receive only one table as input. Relational operators contain or specify the predicates applied during their execution. In addition a "predicate" is an operation that specifies a comparison between two values, e.g., equal to, greater than, not equal to, greater than or equal to, less than or equal to, less than or is null. The method and apparatus can accurately model run time data flow through the nodes of a query tree, thereby enabling the associated optimizer to accurately select the best plan for a particular performance goal.

Computers have the capability of storing vast amounts of data. For example, computers can store and retain data related to thousands of employees of large multi-national corporations, including the departments in which they work, their employee numbers, salaries, job descriptions, geographical locations, etc. This data is often stored in the form of tables in a relational database. In order to extract selected portions of that data from such large computerized databases, users can present a query to the database system in the form of an SQL statement. For example, an SQL statement may be used to ask the database system to list the names of all employees having employee numbers 1001 to 2000. A properly structured SQL statement will result in a list of records that satisfies the question or "query." In this example, the query would produce the names of 1000 employees, assuming that the employees had sequential employee numbers.

Once a user inputs an SQL query into the computer, an SQL compiler operates on the SQL query to develop an efficient way to extract the desired information from the database. Typically, the SQL compiler converts the SQL statement into a number of relational operators stored in computer memory in the form of a query tree. Each node of the tree represents a relational operator, such as a "sort" or "merge" operator. The optimizer portion of the compiler explores a large number of different logically equivalent forms of the query tree, called "plans", for executing the same query. The optimizer program selects, for example, the plan with the lowest estimated cost to respond to the query, and that plan is then executed. In database parlance, "cost" is usually measured in terms of the amount of computer resources utilized by the computer in executing the SQL statement, for example, the number of I/O's or CPU instructions.

The prior art has focused on various techniques, such as the use of histograms, for developing statistics to describe the distribution of data in the database tables upon which the database programs operate. For example, it has been recognized that gathering accurate statistics about the data in the tables is important to the estimate of predicate selectivity. However, both predicate and relational operators can affect the number of rows and UECs that are returned by an operator as the associated algorithm processes the query. The ability to accurately predict the number of rows and UECs returned by both relational operators and predicates is fundamental to computing the cost of an execution plan. The estimated cost, of course, drives the optimizer's ability to select the best plan. Accordingly, there is a need for a method and apparatus that, not only accurately assembles statistics about the tables of raw data to be processed by the database software, but also for a method and apparatus that can accurately predict the number of rows and UECs for each histogram interval that will be returned by any predicate or relational operator in a query tree.

SUMMARY OF THE INVENTION

The present invention includes a new histogram synthesis method and apparatus for predicting the number of rows of data from a relational database and UECs that will be produced by each predicate and relational operator in a query tree. According to an embodiment of the present invention, histogram statistics about data that is to be presented to an operator are generally synthesized "bottom up" along the query tree from the leaf nodes to the root node. In addition, however, those operators below the right, or inner, child of a Nested Join are also presented histogram information by their parent operator(s). Statistical histograms for the leaf nodes of a query tree are generated from the statistical information derived during a binder phase of query compilation.

Given input statistics for each operand of a relational operator, the present invention merges those input statistics for that operator in a fashion reflecting the actual run time effect of that operator on the data. These merged statistics are descriptive of the predicted output of the operator. Similarly, the present invention determines the predicted effect of predicates on the data by applying the predicates directly to the relevant histogram that represents the data. Therefore, unlike certain traditional techniques, the present invention allows the effects of partially or wholly redundant predicates to be handled without the need for sophisticated logic to detect such redundancies. Moreover, the invention recognizes and accounts for the fact that relational operators can impact histogram statistics in a manner that is independent of the predicates.

At each node of the query tree, the present invention provides an accurate prediction of the number of rows and UECs that will be presented to the relational operator and/or predicate and that will be produced by that relational operator and/or predicate. Query cost model software can then utilize these statistics to accurately predict the cost of a particular plan. Thus, the associated optimizer can select the plan that efficiently accommodates the desired performance goal.

BRIEF DESCRIPTION OF THE DRAWINGS

In FIGS. 2–3 the histograms are for the purpose of illustrating the concepts, methods and apparatus of the present invention. They are not drawn to scale and are not intended to show any particular values of row counts, UECs or interval boundaries.

DETAILED DESCRIPTION OF THE PREFERRED EMBODIMENTS

The following description is of the best presently contemplated modes of carrying out the invention. This description is made for the purpose of illustrating the general principles of the invention, and is not to be taken in a limiting sense. The scope of the invention is best determined by reference to the appended claims and equivalents thereof.

1) Overview of the Computer System

Figure 1:
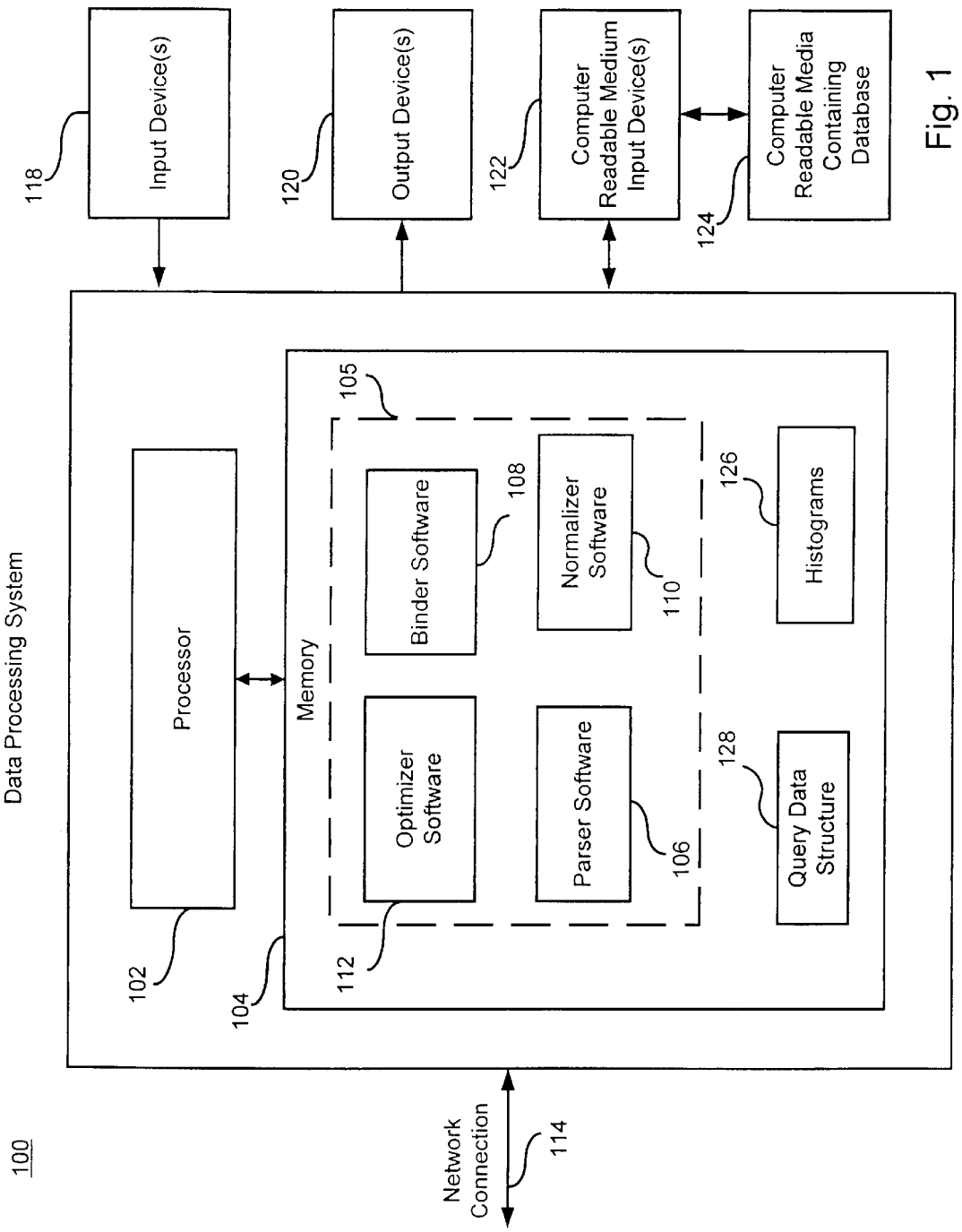
FIG. 1 is a simplified block diagram of a computer system for implementing a preferred embodiment of the present invention.

The present invention may be implemented on a computer system, such as the data processing system 100 illustrated in FIG. 1. The data processing system 100 has at least one processor 102 and associated computer memory 104. The memory 104 includes an SQL compiler 105 having at least "parser" 106, "binder" 108, "normalizer" 110 and "optimizer" 112 software components for implementing the tasks described herein. The described embodiments of the present invention may be performed when instructions contained in memory 104 are executed by the processor 102 or other appropriate processors. As set forth in greater detail below, the compiler 105 may operate on the query data structure 128 and associated histograms 126 in the performance of the functions of the present invention.

When a user inputs a query into a data processing system 100, an SQL compiler 105 may operate on the query to produce an executable query plan. The compiling process typically includes a number of discrete steps which are handled by different components of the compiler 105. First, the "parser" component 106 of the compiler 105 verifies the syntax of the original SQL statement. If the syntax is correct, it produces a syntactically correct query tree. A "binder" component 108 then checks the semantic content of the tree. Then, a "normalizer" component 110 transforms the semantically correct query tree into canonical form. The canonical tree represents, typically, a very large number of logically equivalent ways of processing the query posed by the SQL statement. The "optimizer" component 112 then operates on the canonical tree to generate the set of the logically equivalent query trees. The optimizer 112 then estimates the cost associated with carrying out each plan and selects the plan that best achieves the desired goal.

Data processing system 100 also preferably includes a network connection 114, such as a connection to a LAN or a WAN. System 100 includes an input devices(s) 118 such as a keyboard, touch screen, or the like. System 100 includes an output device(s) 120 such as a printer, display screen or the like. System 100 also includes a computer readable medium input device 122 and computer readable media 124. Computer readable media 124 may be any appropriate medium that has instructions and/or data stored thereon. These instructions and data may be loaded from computer readable media 124 into computer memory 104. Instructions and data can also be loaded into memory in the form of a carrier wave, or by any other type of signal over network connection 114.

System 100 also includes an operating system (not shown). A person of ordinary skill in the art will understand that the memory 104 and computer readable media 124 may contain additional information, such as other application programs, operating systems, other data, etc., which are not shown in the figure for the sake of clarity. It will be understood that data processing system 100 (or any other data processing system described herein) can include numerous elements not shown in FIG. 1, such as additional data, software and/or information in memory, disk drives, keyboards, display devices, network connections, additional memory, additional CPUs, LANs, input/output lines, etc.

2) Overview of the Inventive Process

Figure 2:
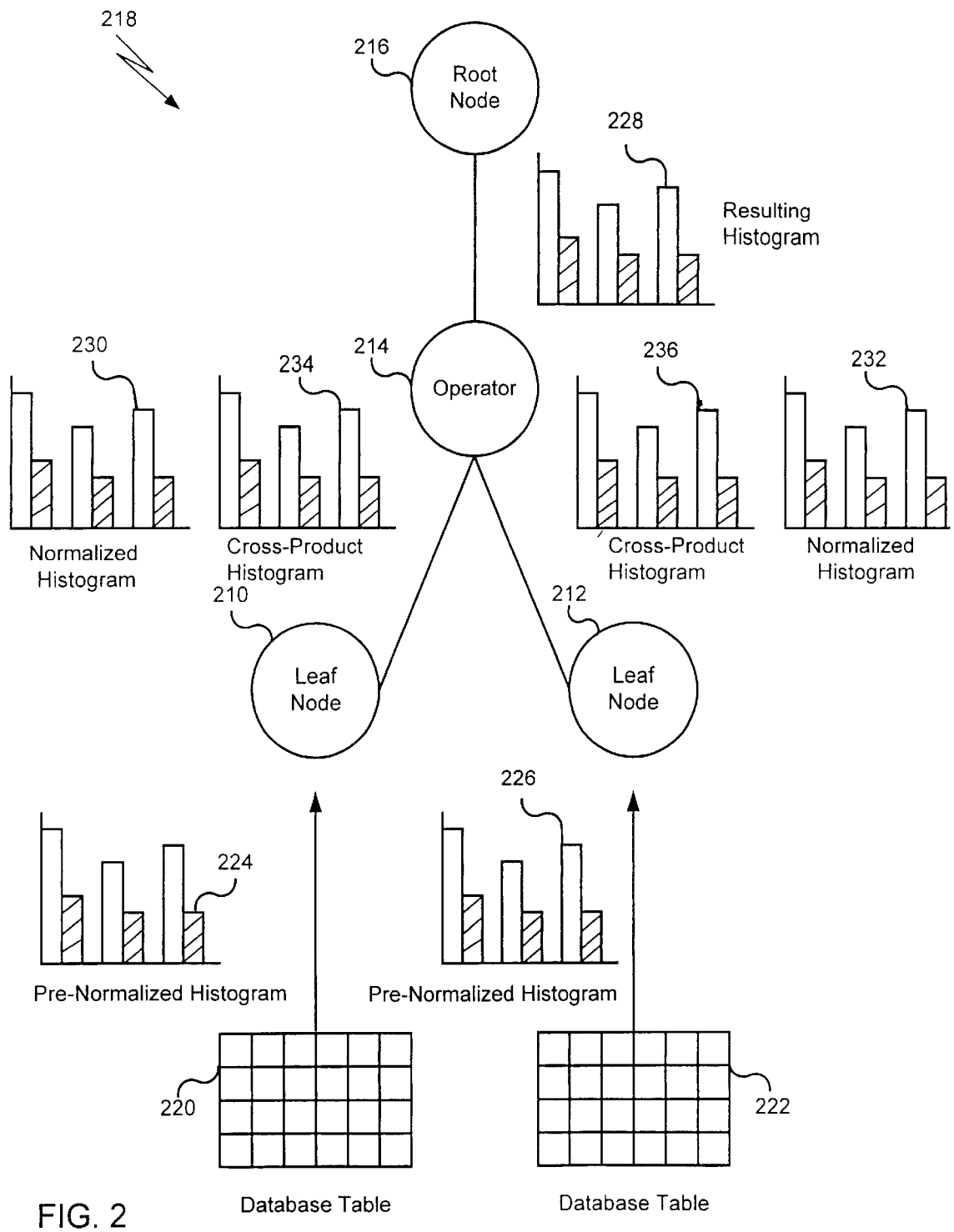
FIG. 2 is a simplified conceptual diagram illustrating generalized steps of a preferred embodiment of the present invention used for implementing a number of different operations.

FIG. 2 illustrates a simplified general method of the present invention. As shown in FIGS. 1 and 2, a query in SQL format may be represented as a data structure 128 in computer memory 104 and may include nodes 210, 212, 214 and 216 in a query tree 218. In the illustrated embodiment, left and right leaf nodes 210, 212 represent Scans of database tables 220 and 222, respectively. Each of these Scans receives an original histogram and produces an associated histogram 224, 226 representative of the statistics associated with the distribution of values of certain selected columns in the associated tables after applying the predicates associated with the scanned table. For example, if tables 220 and 222 contain information about employees of a multinational corporation, the histogram intervals could relate to salary ranges. In this case, each main column of the histograms 224 and 226 indicates the number of employees in each such salary range. Secondary columns of each histogram (indicated in FIG. 2 by hatching) represent the number of unique entries, i.e., UECs, within each interval. For example, if one histogram interval contained a row count of 10, one count for each of 10 employees with salaries ranging from $50,001 to $100,000, and 4 of these employees make $55,000, 4 other employees make $70,000 and two other employees make $90,000, then the UEC for that interval is "3," one count for each of the different salaries.

In the case of a Nested Join, a Scan may also apply predicates relating the outer and inner tables of the Nested Join. The histograms for the outer table having been passed from the Nested Join operator "down" to the Scan operator, the inner table being the scanned table.

Node 214 of FIG. 2 represents a binary relational operator, such as a Join or Union. As previously mentioned, the inventive synthesis process merges the input statistics of histograms 224 and 226, in a fashion reflecting the effect of the operator on the actual rows of data during run time of the database software.

The following subsections set forth the techniques and procedures for manipulating the histograms of the child nodes, e.g. histograms 224 and 226, to produce a histogram of the statistics, e.g. histogram 228, resulting from the operation of the parent relational operator 214 on the data received from the child nodes 210, 212.

3) Histogram Methods For Join Operations

Join operators include Inner Joins, Left Joins and Semi-Joins. There are always two input histograms involved in each of these operations. For the purpose of distinguishing between the two histograms, one will be called the left histogram while the other is called the right histogram.
Common Preparation for Joins Each of the left and right original histograms 224, 226 is first normalized to have the same number of intervals, such that the nth interval of the left histogram has the same upper and lower bounds as the corresponding nth interval of the right histogram. Therefore, the interval boundaries in the normalized histograms 230, 232 are the superset of the intervals of the two original histograms. Each histogram interval has an upper and a lower boundary, a UEC and a row count. Each of the histogram's upper and lower interval boundaries and the associated UECs and row counts are stored in computer memory 126.

In preparation for Left and Inner Join estimations resulting from the procedures described in detail below, a cross-product is taken of the left 230 and right 232 normalized histograms to produce new cross-product histograms 234, 236. That is, the row count for each interval in the normalized left histogram 230 is multiplied by the total row count for the normalized right histogram 232. Similarly, the row count for each interval in the normalized right histogram 232 is multiplied by the total row count for the normalized left histogram 230. Thus, the total row count is the same for both cross-product histograms 234, 236 that result from this cross-product procedure. (The Semi-Join operation does not use this procedure.)

The abbreviations below are used in the following discussion:

Uec=unique entry count (i.e., the number of unique values in the histogram interval under consideration).

LeftUec=Uec for the current interval in the left histogram

RightUec=Uec for the current interval in the right histogram

LeftRowCount=row count for the current interval in the left histogram

RightRowCount=row count for the current interval in the right histogram

XProwCount=the total row count for the normalized left histogram representing the data of a first table times the total row count for the normalized right histogram representing the data of a second table.

MINOF=the minimum of the operands

MAXOF=the maximum of the operands

NumUec=number of unique values for the current interval resulting from the associated operation NumRows=number of rows for the current interval resulting from the associated operation.

TotalUec=the sum of the UECs in all intervals of a specified histogram

TotalRowCount=the sum of the row counts in all intervals of a specified histogram.

Join-Specific Modeling

Throughout the following discussion, the formulas show the effect of the application of a single Join predicate impacting a single pair of histograms, one of which describes a column of data that comes from the left table and one of which described a column of data that came from the right table. However, it will be understood that certain SQL statements may result in repeated application of the formulas. For example, in the case of an Inner Join operator containing the predicate "Table 1. Column_a=Table 2. Column_b AND Table 1. Column_x=Table 2. Column_y," the applicable formulas will be applied twice. (Note: The cross-producting is only done, at most, once.)

a) Inner Join

The formula for an Inner Join operation is, as follows:

NumUec=MINOF(LeftUec, RightUec)

NumRows=(LeftRowCount*RightRowCount)/MAXOF(LeftUec, RightUec)/XProwCount

These formulas are applied to each row of the cross-product histograms 234, 236.

b) Left Join

Figure 3:
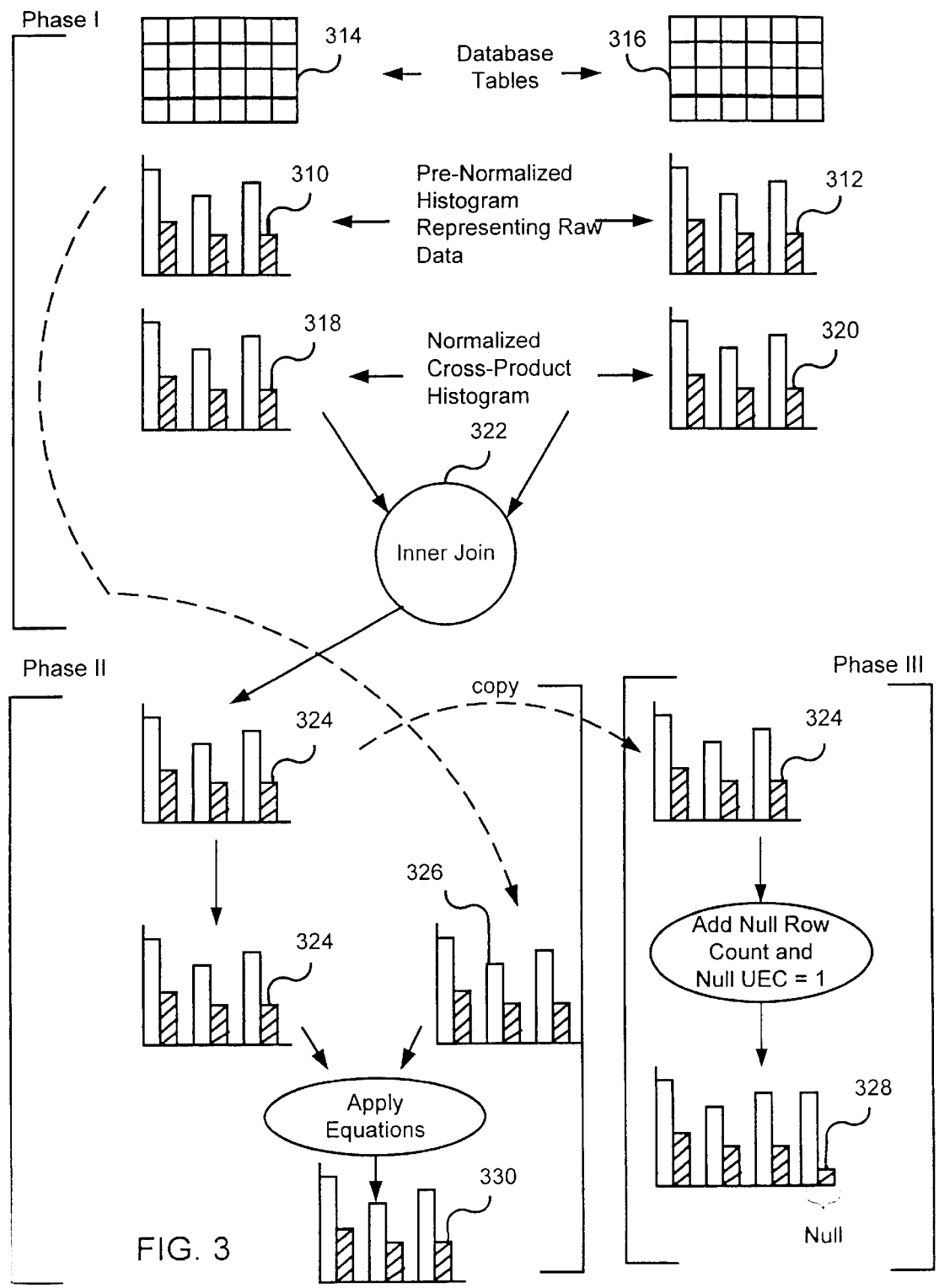
FIG. 3 is a simplified conceptual diagram illustrating the steps of a particular preferred embodiment of the present invention used for modeling a Left Join operation.

The process for determining the row count and UEC resulting from a Left Join operation is significantly more complicated. FIG. 3 illustrates this procedure.

The row count and UECs produced by a Left Join is determined in three phases. In the first phase, we estimate the row counts and UECs as though the Left Join was actually an Inner Join. That is, as explained above, the procedure first generates two pre-normalized histograms 310, 312 based upon two data tables 314, 316. These histograms 310, 312 represent the statistics of the data in the tables, 314, 316, respectively. The cross-product is taken of these two histograms 310, 312, to generate two cross-product histograms 318, 320. The Inner Join procedure is then applied to the two cross-product histograms 314, 316.

In the second phase, as set forth in the equations below, the rows which did not find a match in the Inner Join 322 are added to the histogram 324 resulting from the Inner Join operation 322. The UECs resulting from the Inner Join operation 322 are converted back to the UEC values from the normalized left histogram 310. The right column histogram 326 is a normalized version of the left histogram 310 of Phase I before the Inner Join operation 322 was applied, and before the original histogram was modified by the cross-product operation. That is, the right column histogram 326 of Phase II is the left scan histogram 310, except that it has been normalized. The left column histogram 324 in Phase II is the histogram 324 resulting from the application of the Inner Join operation in Phase I. The following formula is applied to the left 324 and right 326 column histograms on an interval-by-interval basis to produce result histogram 330:

NumUec=RightUec

NumRows=MAXOF(RightRowCount, LeftRowCount+((RightRowCount/RightUec)*(RightUec−LeftUec)))

In Phase II, the difference in the total row counts of the histograms at the end of Phases I and II is calculated. This difference becomes the row count for a the Null value interval. The UEC for the Null Value interval is set to "1". As shown in FIG. 3 at reference number 328, the row count and UEC values for Null are then associated with a copy of histogram 324. Thus:

RowCount$_{Null}$=TotalRowCount$_{phaseII}$−TotalRowCount$_{phaseI}$

UeC$_{Null}$=1

As illustrated in FIG. 3, the Left Join operation, therefore, produces two histograms 328 and 330 as its output. Histogram 330 reflects the left histogram after the Left Join and histogram 328 reflects the Null-augmented right histogram after the Left Join.

c) Semi-Join

The formula for a Semi-Join operation is, as follows:

NumUec=MINOF(LeftUec, RightUec)

NumRows=LeftRowCount*(NumUec/LeftUec)

A Semi-Join is similar to an Inner Join. The formulas are again applied on an interval-by-interval basis. With respect to the UECs, the differences are that Semi-Join does not calculate or use a cross-product histogram and only one row from the right table is allowed to match a row from the left table. With respect to the row counts, as can be seen from the above formulas, for a Semi-Join, we take the percentage of the matching rows times the row count of the left table.

Common Finalizing Steps for Joins

As a final step to produce histograms for all of the Inner, Left, and SemiJoin operations described above, we must apply the selectivities for all predicates to the resulting histogram row counts to give the final result of the Join operations. The selectivity of a predicate is the row count resulting from the operation of the predicate divided by the total row count of either one of the cross-product histograms (remember, their row counts are equal) or, in the case of a Semi-Join, the normalized left histogram. The selectivities of the row counts of all predicates are combined by multiplying them together. The same total selectivity is applied to all histograms to produce the final histograms.

4) Histogram Methods for Union All, Union, Group-by, Scan and Sort Operations The present invention is not limited to use with the Join operators discussed above. The present invention can also manipulate histogram statistics to predict row counts and UECs for other types of database operators, such as, for example, Union All; Union; Group-by and Scan. Thus, the present invention is broadly applicable for effective use with database query optimizers implementing a broad range of different types of querys.

a) Union All

The presently preferred formulas for the Union All operation is, as follows:

NumUec=MAXOF(LeftUec, RightUec)

NumRows=LeftRowCount+RightRowCount, wherein these formulas are applied to the values in each interval of the normalized histograms to produce UECs and row counts for the resulting histogram. The resulting histogram is then passed to a cost model optimizer for use in selecting a desired query plan.

b) Union

Row counts and UECs that result from the application of a Union operator (as opposed to the Union All) are determined by implementing a Union All operation, as discussed above, followed by implementing a Group-by operation on the histogram resulting from execution of the Union All formulas.

c) Group-by

Group-by operators use the histograms resulting from their child operators to determine the UEC for each of the Group-by columns. The presently preferred formulas for Group-by are, as follows:

NumRows=Uec

NumUec=Uec

In these formulas, NumRows and NumUec are the number of rows and UEC values, respectively, for each interval of a Group-by column's histogram which results from execution of the Group-by operation.

d) Scan

Finally, Scan is where the raw histograms, directly reflecting the statistics of the original data tables, are first modified. When the Scan is not below the right, or inner, child of a Nested Join, all predicates on the base table are applied to the associated histograms. When the Scan is below the right, or inner, child of a Nested Join, then in effect the Scan is treated as if it were a Join operator. The histograms passed "down" to the Scan from its parent are treated as if they were passed up by the left, or outer, child of an Inner- or Semi-Join, and the histograms resulting from that Scan are treated as if they were passed up by the right, or inner, child of the Inner- or Semi-Join. Depending upon whether the Nested Join is a Nested Semi-Join, cross producting and prior applicable formulas for the Inner- or Semi-Join are applied.

Following the application of all predicates, the combined reductions in row count are calculated and the resulting selectivity is used to modify the row count and UEC for all the histograms associated with that table. These histograms are then passed to the parent operator.

e) Sort

The Sort operator receives a histogram from its child operator and passes the histogram on to its parent. Sort operations do not affect histograms.

Conclusion

Based upon the above explanation, it will be understood that the procedures comprising the present invention can produce an accurate estimate of the number of rows and UECs that will be produced by each operator or predicate and passed to a parent operator or predicate in the query tree. The parent may, in turn, pass its histograms to its parent operator or, in the case of a Nested Join, to its right, or inner, child operator. These row counts and UECs may be used by any of a variety of cost modeling software programs (such as that described in the related patent application referenced above) to predict the cost of various execution plans. The related patent application is incorporated herein by reference.

Several preferred embodiments of the present invention have been described. Nevertheless, it will be understood that various other modifications may be made to the described invention without departing from its spirit and scope. For example, the present invention is not limited to any particular implementation or programming technique, and the invention may be implemented using various techniques for achieving the functionality described herein. The invention may be implemented in any appropriate operating system using appropriate programming languages and/or programming techniques. Thus, the present invention is not limited to the presently preferred embodiments described herein, but may be altered in a variety of ways which will be apparent to persons skilled in the art based on the present description.

We claim:

1. A process for producing predictive information about execution of an operation on data in a relational database, the process performed by a data processing system and comprising:

receiving statistical information about rows of data in the relational database, the statistical information existing for each of a plurality of intervals of the data, wherein the statistical information includes a UEC (unique entry count) for certain of the plural intervals; and manipulating the statistical information, in accordance with the operation, on an interval by interval basis, to yield new statistical information also having a plurality of intervals and reflecting the predicted effect of the operation on the data.

2. The process of claim 1, wherein the statistical information includes a row count for certain of the plural intervals.

3. A process for producing predictive information about execution of an operation on data in a relational database, the process performed by a data processing system and comprising:

receiving statistical information about rows of data in the relational database, the statistical information existing for each of a plurality of intervals of the data, wherein the statistical information includes at least one row count and at least one UEC for certain of the plural intervals; and manipulating the statistical information, in accordance with the operation, on an interval by interval basis, to yield new statistical information also having a plurality of intervals and reflecting the predicted effect of the operation on the data.

4. The process of claim 3, wherein the operation includes the execution of a Join operator, and wherein the statistical information includes a first set of two histograms representing distributions of data in two database tables, each histogram having row counts and UECs reflecting the distribution of the data in the two databases.

5. The process of claim 4 wherein, if the original two histograms have different intervals, then the manipulating step further includes the step of normalizing the histograms to have the same number of intervals, each interval having the same lower and upper bounds.

6. The process of claim 4, wherein the manipulating step further includes the step of producing a second set of two histograms resulting from a cross-product of the first set of two histograms.

7. The process of claim 6, wherein the operator is an Inner Join and the manipulating step includes the application of the following formulas on each interval of the second set of two histograms:

NumUec=MinOf(LeftUec, RightUec)

NumRows=(LeftRowCount*RightRowCount)/MAXOF(LeftUec, RightUec)/XProwCount)

8. The process of claim 6, wherein the operator is a Semi-Join and the following formulas are applied for each interval:

NumUec=MINOF(LeftUec, RightUec)

NumRows =LeftRowCount*(NumUec/LeftUec)

9. The process of claim 4, wherein the new statistical information is passed to a parent operator.

10. The process of claim 3, wherein the operator is a Scan and wherein all predicates on the base table are applied to the associated intervals.

11. A process for producing predictive information about execution of a query on data in a relational database, the process performed by a data processing system and comprising:

creating a query data structure in memory for the query;

selecting a current operation corresponding to a current node in the query data structure;

receiving statistical information about rows of data in the relational database associated with at least one child of the current node, the statistical information existing for each of a plurality of intervals of the data, wherein the statistical information includes a UEC for certain of the plural intervals; and manipulating the statistical information, in accordance with the current operation, on an interval by interval basis, to yield statistical information for the current node, having a plurality of intervals and reflecting the predicted effect of the operation on the data.

12. The process of claim 11, wherein the query data structure is a query tree.

13. A data processing apparatus for producing predictive information about execution of a query on data in a relational database, the apparatus comprising:

means for creating a query data structure in memory for the query;

means for selecting a current operation corresponding to a current node in the query data structure;

means for receiving statistical information about rows of data in the relational database associated with at least one child of the current node, the statistical information existing for each of a plurality of intervals of the data, wherein the statistical information includes a UEC for certain of the plural intervals; and means for manipulating the statistical information, in accordance with the current operation, on an interval by interval basis, to yield statistical information for the current node, having a plurality of intervals and reflecting the predicted effect of the operation on the data.

14. A database apparatus for producing predictive information about execution of a query on data in the database, the apparatus having a memory and comprising:

a portion configured to create a query data structure in the memory, wherein the query data structure includes parent and child nodes;

a portion configured to select a current operation corresponding to a current node in the query data structure;

a portion configured to receive statistical information about rows of data in the database associated with at least one child of the current node, the statistical information existing for each of a plurality of intervals of the data, wherein the statistical information includes a UEC for certain of the plural intervals; and a portion configured to manipulate the statistical information, in accordance with the current operation, on an interval by interval basis, to yield statistical information for the current node, having a plurality of intervals and reflecting the predicted effect of the operation on the data.

* * * * *